June 24, 1930.  A. RUCKSTUHL  1,767,702
REGULATING VALVE
Filed May 6, 1929
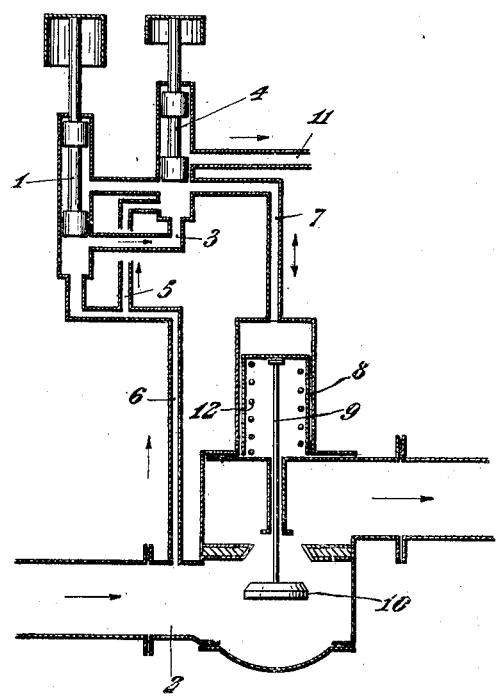
Inventor:
Alwin Ruckstuhl
By [signature]
Atty.

Patented June 24, 1930

1,767,702

UNITED STATES PATENT OFFICE

ALWIN RUCKSTUHL, OF WINTERTHUR, SWITZERLAND, ASSIGNOR TO SWISS LOCOMOTIVE AND MACHINE WORKS, OF WINTERTHUR, SWITZERLAND, A CORPORATION

REGULATING VALVE

Application filed May 6, 1929, Serial No. 360,649, and in Germany May 10, 1928.

The present invention relates to a regulating valve for intermittently conveying a compressed medium from a primary to a secondary conduit, which valve is controlled by a relay connected to the primary conduit.

According to the invention there is provided a regulating valve characterized in that the valve controlled by a relay opens for intermittently charging a secondary conduit when a desired maximum pressure is reached in the primary conduit, and closes as soon as the pressure in the primary conduit has sunk to a desired minimum pressure that is independent of the maximum pressure.

One embodiment of the invention is diagrammatically illustrated in section in the accompanying drawing.

Referring to the drawing, the space below a controlled piston 1 is always in open communication with the primary conduit 2. As soon as the desired maximum pressure is reached in the latter, the piston 1 is lifted; the medium passes through a duct 3 to below a piston 4 and lifts this also, thereby opening a pressure-equalizing duct 5 and connecting together pipes 6 and 7.

The medium now flows through pipe 7 into the space above a piston 8 and presses this downwards. The valve 10 is opened by means of a piston rod 9, and the medium can flow directly through the primary conduit 2. If the pressure in the latter falls a fraction of an atmosphere the piston 1 returns into its lower position. This movement, however, does not cause closure of the valve 10 because the pressure below the piston 4 is maintained owing to the medium flowing through the pipe 6 and the pressure-equalizing duct 5.

Only when the pressure in the primary conduit 2 has fallen to the desired minimum does the suitably loaded piston 4 return into its lowest position, closes the pressure-equalizing duct 5 and connects the pipes 7 and 11 together.

The medium above the piston 8 then flows into the open.

The spring 12 closes the valve 10 and no more medium can flow past it. This valve 10 may be of any convenient kind, for example, a poppet valve or a slide valve.

The difference in pressure at which the described apparatus operates may be selected as desired.

I claim:—

The combination with a primary conduit, a valve for controlling the same, a spring tending to close said valve, and a cylinder and piston for opening said valve of a pipe opening at one end into said primary conduit, a piston valve controlling the other end of said pipe, a second pipe having one end connected to said cylinder, a pressure-equalizing duct connecting said pipes together, and a second piston valve arranged to control the connection of said pipes one with the other, and to close and open said pressure-equalizing duct, and to place said second pipe into communication with the atmosphere.

In testimony whereof I affix my signature.

ALWIN RUCKSTUHL.